US008425079B2

(12) United States Patent
Shiroishi et al.

(10) Patent No.: US 8,425,079 B2
(45) Date of Patent: Apr. 23, 2013

(54) ELECTRONIC DEVICE

(75) Inventors: Toshikazu Shiroishi, Hamura (JP); Tomohiro Hamada, Tachikawa (JP); Tomoko Kitamura, Ome (JP); Toshio Konno, Akiruno (JP); Kohei Wada, Tachikawa (JP); Ryosuke Saito, Koganei (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 305 days.

(21) Appl. No.: 12/880,006

(22) Filed: Sep. 10, 2010

(65) Prior Publication Data

US 2011/0141732 A1 Jun. 16, 2011

(30) Foreign Application Priority Data

Dec. 16, 2009 (JP) ................. 2009-285429

(51) Int. Cl.
*F21V 7/00* (2006.01)
*F21V 1/00* (2006.01)

(52) U.S. Cl.
USPC ........... 362/241; 362/248; 362/555; 362/581; 362/249.02

(58) Field of Classification Search .................. 362/551, 362/554, 555, 608–610, 615, 616, 628, 631, 362/559–561, 581, 237, 240, 241, 247, 248, 362/249.01, 249.02
See application file for complete search history.

(56) References Cited

U.S. PATENT DOCUMENTS

| | | | | |
|---|---|---|---|---|
| 5,349,504 A | * | 9/1994 | Simms et al. | 362/555 |
| 5,481,440 A | * | 1/1996 | Oldham et al. | 362/555 |
| 5,874,901 A | * | 2/1999 | Ohyama | 340/815.42 |
| 5,988,842 A | * | 11/1999 | Johnsen et al. | 362/551 |
| 6,623,152 B1 | * | 9/2003 | Kroening | 362/555 |
| 7,293,904 B2 | * | 11/2007 | Beitelspacher | 362/555 |
| 2009/0244883 A1 | | 10/2009 | Natsume et al. | |

FOREIGN PATENT DOCUMENTS

| | | |
|---|---|---|
| JP | 51-5381 U | 1/1976 |
| JP | 4-37986 U | 3/1992 |
| JP | 7-10782 U | 2/1995 |
| JP | 11-024608 | 1/1999 |
| JP | 2001-024229 A | 1/2001 |
| JP | 2001-184003 | 7/2001 |
| JP | 2002-072933 | 3/2002 |
| JP | 2002-162550 A | 6/2002 |
| JP | 2002-244595 | 8/2002 |
| JP | 3532794 | 5/2004 |

(Continued)

OTHER PUBLICATIONS

Japanese Office Action dated Oct. 4, 2011 for Japanese Application No. 2011-050590.
Japanese Office Action dated May 31, 2011 for Japanese Application No. 2011-050590.

(Continued)

*Primary Examiner* — Thomas Sember
(74) *Attorney, Agent, or Firm* — Knobbe, Martens, Olson & Bear LLP

(57) ABSTRACT

According to one embodiment, a lighting unit incorporated in the housing of a note PC includes a lens unit provided with a plurality of light guiding lenses formed of a transparent resin, and a plurality of couplers coupling the light guiding lenses. A plurality of light shielding plates project from the inner surface of the housing between the light guiding lenses. Each light shielding plate has an upper edge at a level higher than the light input surfaces of the light guiding lenses.

16 Claims, 5 Drawing Sheets

FOREIGN PATENT DOCUMENTS

| | | |
|---|---|---|
| JP | 2008-096745 | 4/2008 |
| JP | 2008-96745 A | 4/2008 |
| JP | 2009-180926 | 8/2009 |
| JP | 2009-236972 | 10/2009 |
| JP | 2010-014754 | 1/2010 |

OTHER PUBLICATIONS

Japanese Office Action dated Feb. 7, 2012 for Japanese Application No. 2011-050590.

* cited by examiner

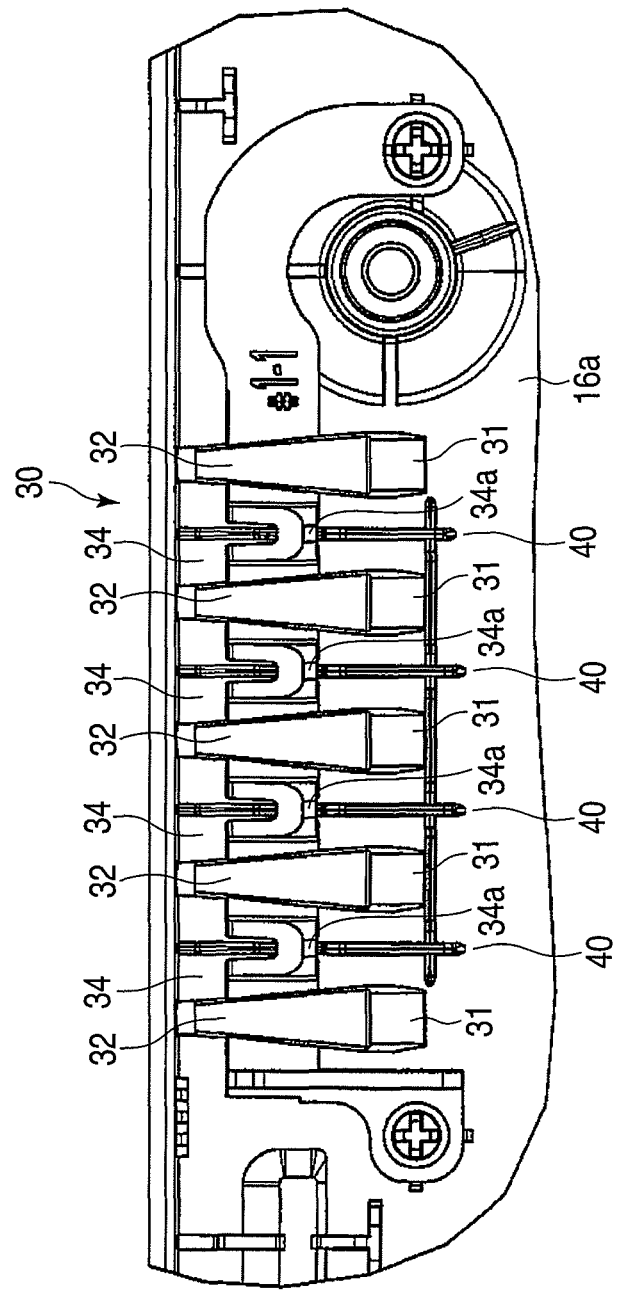
F I G. 3

ELECTRONIC DEVICE

CROSS-REFERENCE TO RELATED APPLICATIONS

This application is based upon and claims the benefit of priority from Japanese Patent Application No. 2009-285429, filed Dec. 16, 2009; the entire contents of which are incorporated herein by reference.

FIELD

Embodiments described herein relate generally to an electronic device equipped with a lens unit including a plurality of light guiding lenses arranged close to each other, through which lens unit the light emitted from a plurality of light sources is output.

BACKGROUND

Jpn. Pat. Appln. KOKAI Publication No. 2008-96745 (Patent Document 1) discloses a lens group (light guiding lenses), through which the light emitted from a plurality of light emitting diodes (LEDs) is output. The light guiding lenses are formed close to each other and integral as one body, with a plurality of couplers, bent to a U-shape, interposed therebetween.

Since the couplers are formed integral as one body and made of the same transparent resin as the light guiding lenses, the light passing through one of adjacent light guiding lenses will be transmitted to the other light guiding lens via the corresponding coupler. If a great amount of light is transmitted via the coupler, part of the light may well be transmitted to a light output portion adjacent to a target one, with the result that selective emission through a desired one of light output portions cannot be realized.

To avoid this, in Patent Document 1, the couplers coupled to the lenses are bent to a U-shape in order to minimize the amount of light undesirably transmitted to a non-target light guiding lens via one of the couplers.

However, in Patent Document 1, the idea of bending the couplers to a U-shape cannot sufficiently realize selective emission through a desired one of light output portions, although the light passing through the couplers is suppressed. For instance, in Patent Document 1, since there is nothing between the light guiding lenses, light will be transmitted between adjacent light guiding lenses. In addition, since the distance between the light input portion of each light guiding lens to the adjacent coupler is relatively short, the light that has entered the light input portion of a target light guiding lens will easily be transmitted to the adjacent light guiding lens through the coupler located between these lenses.

BRIEF DESCRIPTION OF THE DRAWINGS

A general architecture that implements the various feature of the embodiments will now be described with reference to the drawings. The drawings and the associated descriptions are provided to illustrate the embodiments and not to limit the scope of the invention.

FIG. 3 is an enlarged plan view illustrating a structure obtained when a circuit board is detached from the lighting unit shown in FIG. 2;

DETAILED DESCRIPTION

Figure 1:
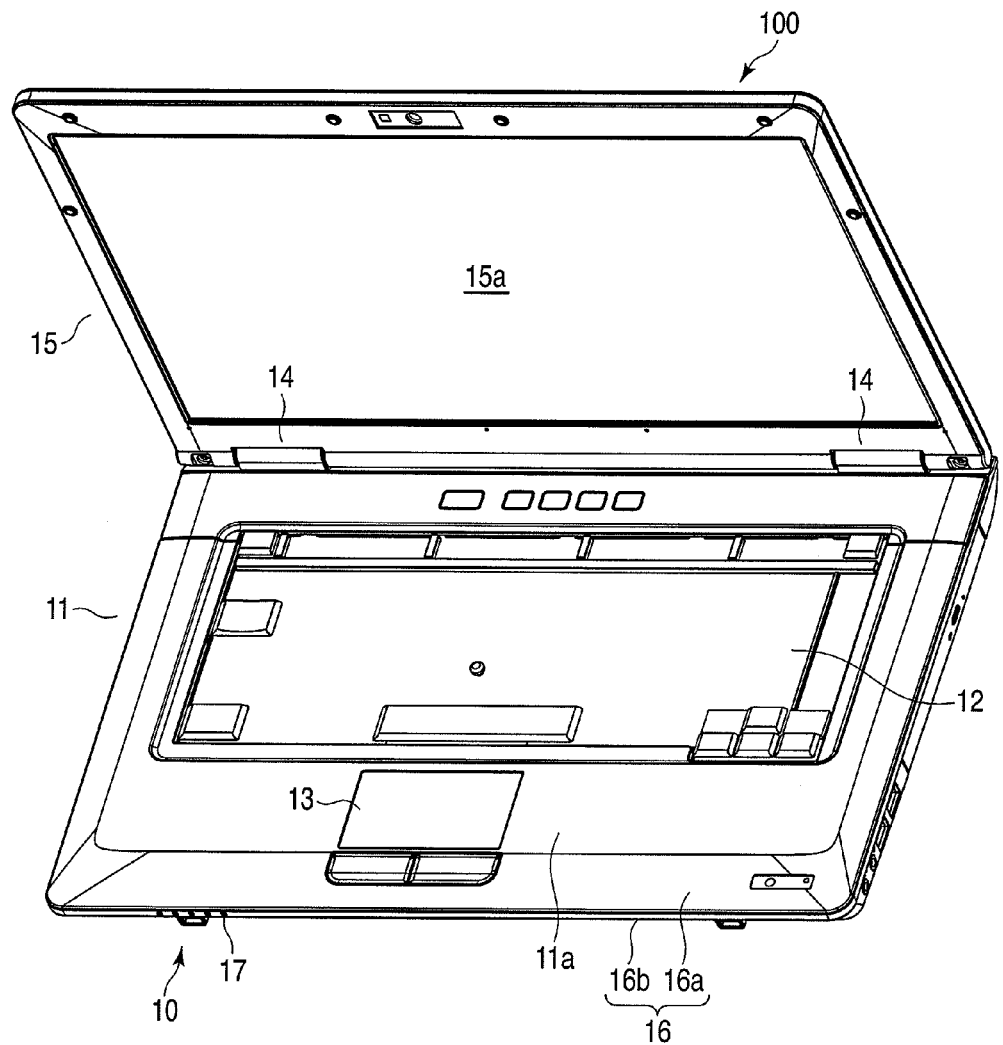
FIG. 1 is a perspective view illustrating an example of an electronic device that incorporates a lens unit according to an embodiment of the invention.

Various embodiments will be described hereinafter with reference to the accompanying drawings.

In general, according to the embodiment of the invention, a lighting unit 10 incorporated in the housing 16a of a note PC comprises a lens unit 30 that includes a plurality (five in the embodiment) of light guiding lenses 32 formed of transparent resin and coupled to each other by couplers 34. Light shielding plates 40 (light shielding member) projecting from the inner surface of the housing 16a are interposed between the light guiding lenses 32. Each light shielding plate 40 has an upper edge of a higher level than the light receiving surface 31 of each light guiding lens 32.

FIG. 1 is a perspective view illustrating an outward appearance of a notebook-type personal computer (hereinafter referred to simply as a note PC) 100.

As shown in FIG. 1, the note PC 100 comprises a PC main unit 11 having a surface 11a on which a keyboard 12, a touch pad 13, etc. are provided, and a display panel 15 rotatably attached to the rear end of the PC main unit 11 via hinges 14. The display panel 15 has a display screen 15a, and is rotatable between an open position in which the surface 11a of the PC main unit 11 is exposed, and a closed position (not shown) in which the surface 11a is not exposed.

The PC main unit 11 comprises a rectangular housing 16 that includes a housing component 16a located at the surface 11a side and provided with input units 12 and 13, and a housing component 16b located at the reverse side and engaged with the housing component 16a. A lighting unit 10 is incorporated in a front left portion of the housing 16. Further, a plurality (five in the embodiment) of circular holes 17 for exposing the light emission surfaces 33 of the plurality of light guiding lenses 32, described later, are formed in the front side wall of the housing component 16a.

The lighting unit 10 of the embodiment includes five lamps, such as a lamp for indicating whether a power supply plug is inserted in the note PC 100, a lamp for indicating whether the note PC 100 is in the ON state, a lamp for indicating whether a hard disk drive (HDD), not shown, is operating. The lamps indicate the respective states by being turned on or off, or flickering.

Referring now to FIGS. 2 to 8, a detailed description will be given of the lighting unit 10 incorporated in the housing 16 of the PC main unit 11.

Figure 2:
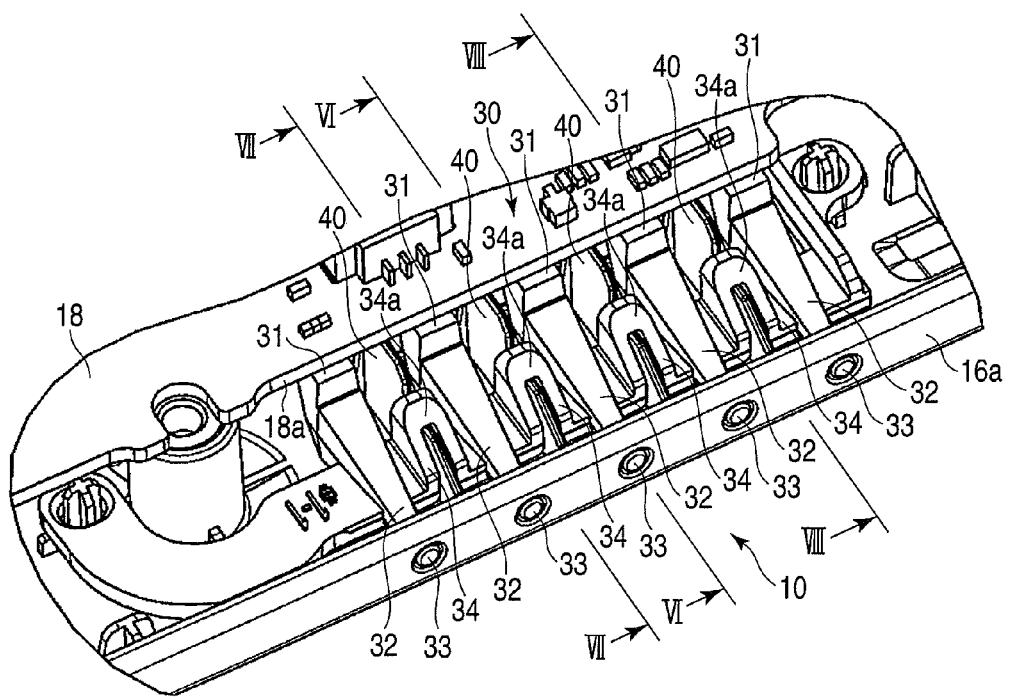
FIG. 2 is an enlarged perspective view illustrating a lighting unit incorporated in the PC main unit of the note PC shown in FIG. 1.
Figure 4:
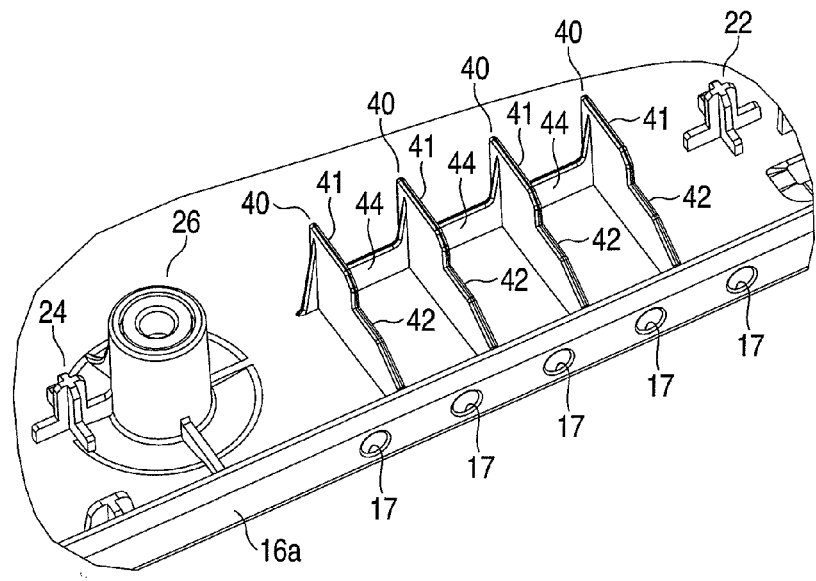
FIG. 4 is an enlarged perspective view illustrating a structure obtained when a lens unit is removed from the structure shown in FIG. 3.
Figure 5:
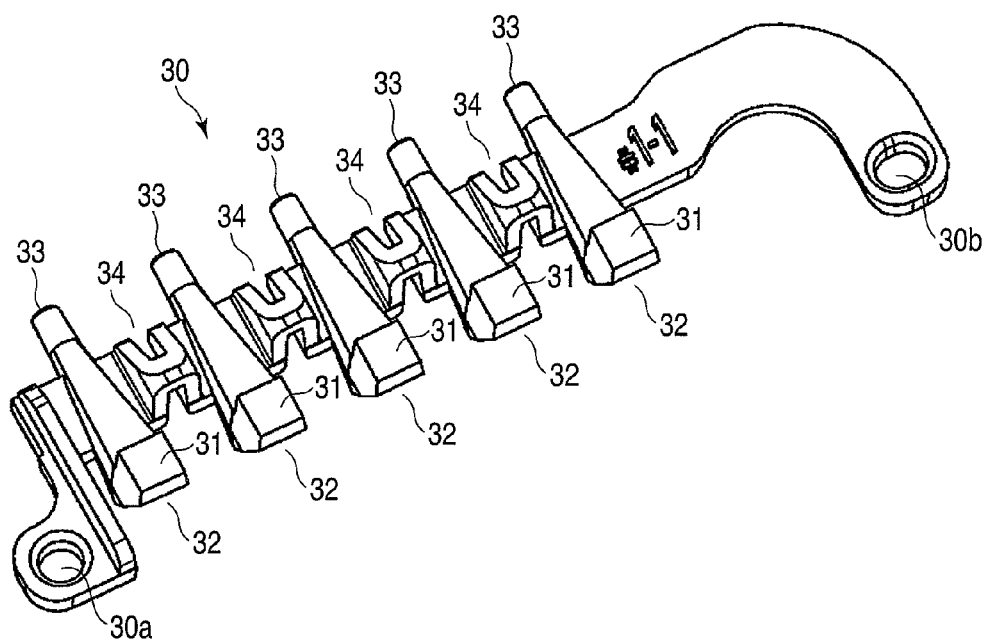
FIG. 5 is a perspective view illustrating the lens unit incorporated in the lighting unit shown in FIG. 2.
Figure 6:
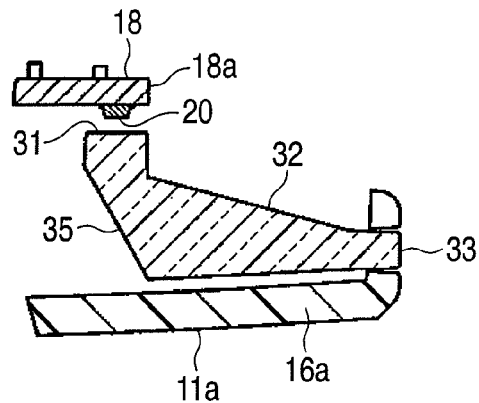
FIG. 6 is a partially enlarged sectional view taken along line VI-VI of FIG. 2.
Figure 7:
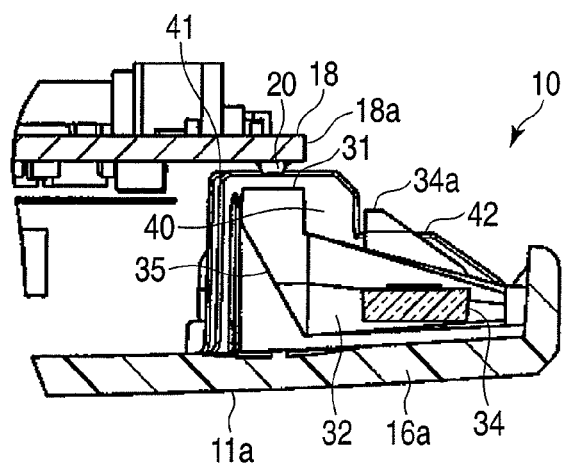
FIG. 7 is a partially enlarged sectional view taken along line VII-VII of FIG. 2.
Figure 8:
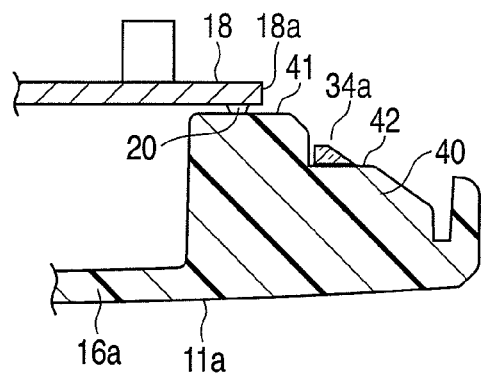
FIG. 8 is a partially enlarged sectional view taken along line VIII-VIII of FIG. 2.

FIG. 2 is an enlarged perspective view illustrating the lighting unit 10 incorporated in the housing component 16a upside of the PC main unit 11. FIG. 3 is an enlarged plan view illustrating a structure obtained when a circuit board 18 is detached from the lighting unit shown in FIG. 2. FIG. 4 is an enlarged perspective view illustrating a structure obtained when a lens unit 30 is removed from the structure shown in FIG. 3. FIG. 5 is an enlarged perspective view illustrating the lens unit 30 incorporated in the lighting unit shown in FIGS. 2 and 3. FIG. 6 is an enlarged sectional view taken along line VI-VI of FIG. 2. FIG. 7 is an enlarged sectional view taken along line VII-VII of FIG. 2. FIG. 8 is an enlarged sectional view taken along line VIII-VIII of FIG. 2.

The lighting unit 10 includes five LEDs (light sources) 20, the lens unit 30, and four light shielding plates 40.

The five LEDs 20 (only one of which is shown in each of FIGS. 6, 7 and 8) are mounted on the circuit board 18 that is received in the housing 16 of the PC main unit 11 so that the board 18 lies substantially in parallel with the surface 11a of the PC main unit 11. More specifically, the five LEDs 20 are mounted at regular intervals on one surface of the circuit board 18 along the front edge 18a thereof, the one surface opposing the housing component 16a.

Since various electronic components are mounted on the circuit board 18, as well as the LEDs 20, it is necessary to define a space between the front edge 18a and the front wall of the housing component 16a so that the front edge 18a and the front wall will be kept away from each other even when undesirable impact is exerted on the PC main unit 11. This being so, the LEDs 20 mounted along the front edge 18a are kept away from the front wall of the housing component 16a.

The lens unit 30 includes the five light guiding lenses 32, and the four couplers 34 coupling the lenses 32. The elements 32 and 34 of the lens unit 30 are made of a transparent resin, and are formed integral as one body as shown in FIG. 5. Further, the shape of the lens unit 30 is designed so that the unit 30 can be molded using a mold.

Each light guiding lens 32 includes a rectangular light input surface 31, and a circular light output surface 32 at opposite ends, and also includes a reflection surface 35 located between the light input and output surfaces 31 and 33 for deflecting the passing light by substantially 45 degrees. Namely, the light input and output surfaces 31 and 33 are perpendicular to each other. Further, each light guiding lens 32 is tapered from the reflection surface 35 to the light output surface 33.

When the lens unit 30 is positioned at a preset position, the light input surfaces 31 of the light guiding lenses 32 closely oppose the respective LEDs 20 mounted on the circuit board 18. Further, in this state, the light output surfaces 33 of the light guiding lenses 32 are exposed to the outside of the PC main unit 11 through the holes 17 formed in the front wall of the housing component 16a as shown in FIG. 2. Namely, a gap is formed between the LEDs 20 and the light input surfaces 31 of the light guiding lenses 32, assuming that an external force may be applied to the PC main unit 11 to thereby deform the circuit board 18.

The couplers 34 coupled to the light guiding lenses 32 are provided closer to the light output surfaces 33 of the lenses 32 than to the light input surfaces 31 of the lenses 32. In other words, each coupler 34 couples a pair of adjacent light guiding lenses 32 at a position away from the corresponding light input surface 31. This structure prevents the light input to the light input surface 31 from directly reaching the couplers 34.

Namely, in this case, the light received by a certain light input surface 31 passes through the corresponding light guiding lens 32, whereby the light is diffused and weakened. The thus weakened light reaches the coupler(s) 34 adjacent to this lens 32. As a result, the light guided via the coupler 34 to another light guiding lens 32 adjacent to the first-mentioned one can be minimized. In the embodiment, each coupler 34 is located at a position at which it couples adjacent light guiding lenses 32 between the reflection surfaces 35 and the light output surfaces 33 (see FIG. 7).

The four light shielding plates 40 project substantially vertically from the inner surface of the housing component 16a of the PC main unit 11. As shown in FIG. 4, the light shielding plates 40 extend parallel to each other at substantially regular intervals along the front wall of the housing component 16a, and is each interposed between the corresponding ones of the five light guiding lenses 32. Since the housing component 16a of the PC main unit 11 is formed of an opaque resin material, the four light shielding plates 40 are also formed of an opaque material that does not pass light therethrough.

When the lens unit 30 is attached in a preset position, the upper edges 41 of the light shielding plates 40 are at a level higher than the light input surfaces 31 of the light guiding lenses 32 as shown in FIG. 7, and lower than the lower surface of the circuit board 18. Further, the light shielding plates 40 have a size at least greater than the size of the light guiding lenses 32 so that the light guiding lenses 32 located with the corresponding shielding plate 40 interposed therebetween will be concealed from each other.

Since the upper edges 41 of the light shielding plates 40 are at a level higher than the light input surfaces of the light guiding lenses 32, the disadvantage that the light emitted from a certain LED 20 is directly input, via the light input surface 31 of the one of the adjacent light guiding lenses 32 which opposes the certain LED 20, into the light input surface 31 of the other light guiding lens 32 can be avoided. As a result, interference of light between the adjacent light guiding lenses 32 is avoided, and light can be output through only a desired one of the light output surfaces 33 of the light guiding lenses 32. Further, since the size of the light shielding plates 40 is set greater than that of the light guiding lenses 32 so that the adjacent light guiding lenses 32 will be completely concealed from each other, there is no possibility of light transmission between the adjacent light guiding lenses 32.

Furthermore, as shown in FIG. 8, the light shielding plates 40 have stepped portions 42 to be engaged with the couplers 34 that couple the light guiding lenses. The stepped portions 42 are at a level lower than the upper edges 41. The couplers 34 are bent to have a substantially U-shaped cross section so that they can bridge the stepped portions 42. Since the couplers 34 are thus bent, light can be prevented from being undesirably transmitted between the adjacent light guiding lenses 32 through the couplers 34.

The bridge portions 34a of the couplers 34 that bridge the stepped portions 42 of the light shielding plates 40 are formed thinner than the other portions of the couplers 34. In other words, the bridge portions 34a have a smaller cross section than those of the other portions. As a result, even if a small amount of light passes through the couplers 34, the bridge portions 34a can further reduce the light passing therethrough, whereby the light transmitted between the adjacent light guiding lenses 32 can further be reduced.

More specifically, the couplers 34 that couple the light guiding lenses 32 not only have a shape obtained by U-shaping a slim strip member, but are also tapered to their tops. This shape will not involve any problem in molding the lens unit 30 as one body, and will not be a factor for increasing the manufacturing cost of the device.

Reinforcing plates 44 are provided between the light shielding plates 40 for coupling and reinforcing them. The reinforcing plates 44 also vertically project from the inner surface of the housing component 16a.

When assembling the above-described lighting unit 10, the lens unit 30 is attached to fit the couplers 34 on the stepped portions 42 of the light shielding plates 40. On the inner surface of the housing component 16a, there are provided a boss 22 to be inserted into a hole 30a formed in the lens unit 30, a boss 24 to be inserted into a hole 30b formed in the lens unit 30, and a boss 26 for fastening the circuit board 18 using a screw (not shown).

The lighting unit 10 is assembled by attaching the lens unit 30 to the bosses 22 and 24, and then fastening the circuit board 18 to the boss 26. At this time, it is a matter of course that the LEDs 20 mounted on the circuit board 18 oppose the light input surfaces 31 of the light guiding lenses 32 with a short gap therebetween.

As described above, in the embodiment, since the light shielding plates 40 interposed between the light guiding lenses 32 of the lens unit 30 have the upper edges 41 set at a level higher than the light input surfaces 31 of the light guiding lenses 32, light emitted by a certain LED 20 can be prevented from being undesirably transmitted to a light guiding lens 32 adjacent to a target light guiding lens 32 through the light input surface 31 of the adjacent lens 32. Further, since in the embodiment, the transparent couplers 34 that couple the light guiding lenses 32 are located away from the light input surfaces 31 of the light guiding lenses 32, the amount of light input via the light input surfaces 31 and transmitted to the couplers 34 can be minimized. In addition, since the couplers 34 are U-shaped, and further the bridge portions 34a are formed to have a small cross section, the amount of light to be transmitted through the couplers 34 can further be reduced. Thus, in the lighting unit 10 of the embodiment, the lamps located close to each other can be selectively lit, thereby enhancing the visibility of the lamps.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For instance, although in the above-described embodiment, the invention is applied to the lighting unit 10 incorporated in the note PC 100, it is not limited to this, but may be applied to PDAs or other electronic devices.

What is claimed is:

1. An electronic device comprising:
   a first light source;
   a second light source;
   a first light guiding lens comprising a first light input surface and a first light output surface away from the first light input surface, the first light guiding lens being configured to receive light from the first light source through the first light input surface, and to guide the received light to the first light output surface;
   a second light guiding lens comprising a second light input surface and a second light output surface away from the second light input surface and close to the first light output surface, the second light guiding lens being configured to receive light from the second light source through the second light input surface, and to guide the received light to the second light output surface;
   a light shielding plate interposed between the first and second light guiding lenses, at least a portion of the light shielding plate having a height higher than the first and second light input surfaces; and
   a coupler comprising a coupling portion coupling the first and second light guiding lenses over the light shielding plate, the coupling portion having a cross section smaller than other portions of the coupler.

2. The electronic device of claim 1, wherein the coupler is configured to couple the first and second light guiding lenses at a position closer to the first light output surface than to the first light input surface, and closer to the second light output surface than to the second light input surface.

3. The electronic device of claim 2, wherein the first and second light guiding lenses and the coupling portion are made of a resin and formed integral as one body.

4. The electronic device of claim 1, wherein the first light guiding lens comprises a first reflection surface between the first light input surface and the first light output surface;
   the second light guiding lens comprises a second reflection surface between the second light input surface and the second light output surface; and
   the coupling portion is configured to couple the first and second light guiding lenses between the first reflection surface and the first light output surface and between the second reflection surface and the second light output surface.

5. The electronic device of claim 4, wherein the first and second light guiding lenses and the coupling portion are made of a resin and formed integral as one body.

6. The electronic device of claim 1, wherein the first and second light guiding lenses and the coupling portion are made of a resin and formed integral as one body.

7. An electronic device comprising:
   a plurality of light sources; and
   a lens unit comprising a plurality of light guiding lenses corresponding to the light sources and arranged adjacent to each other, and a transparent coupler configured to couple the light guiding lenses, each of the light guiding lenses having a light input surface and a light output surface at opposite ends thereof, the each light guiding lens facing a corresponding one of the light sources and being configured to receive, through the light input surface thereof, light emitted by the corresponding light source, and to guide the received light to the light output surface thereof, the light output surfaces being arranged close to each other, the transparent coupler coupling the light guiding lenses at a position closer to the light output surfaces than to the light input surfaces; and
   a light shielding plate interposed between adjacent ones of the light guiding lenses and having a height higher than the light input surfaces of the adjacent ones of the light guiding lenses,
   wherein the coupler is bent to have a bridge portion that bridges the light shielding plate and has a smaller cross section than other portions of the coupler.

8. The electronic device of claim 7, wherein the light guiding lenses comprise reflection surfaces between the light input surfaces and the light output surfaces, and the coupler is configured to couple the adjacent ones of the light guiding lenses between the reflection surfaces and the light output surfaces.

9. The electronic device of claim 8, wherein the light guiding lenses and the coupler of the lens unit are made of a transparent resin and formed integral as one body.

10. The electronic device of claim 7, wherein the light guiding lenses and the coupler of the lens unit are made of a transparent resin and formed integral as one body.

11. An electronic device comprising:
    a housing comprising a circuit board provided with a plurality of light sources;
    a lens unit comprising a plurality of light guiding lenses corresponding to the light sources and arranged adjacent to each other, and a transparent coupler configured to couple the light guiding lenses, each of the light guiding lenses having a light input surface and a light output surface at opposite ends thereof, the each light guiding lens facing a corresponding one of the light sources and being configured to receive, through the light input surface thereof, light emitted by the corresponding light source, and to guide the received light to the light output surface thereof, the light output surfaces of the guiding lenses being arranged close to each other; and a light shielding plate projecting from an inner surface of the housing, interposed between adjacent ones of the light guiding lenses, and having a height higher than the light input surfaces of the adjacent ones of the light guiding lenses, wherein the coupler is bent to have a bridge portion that bridges the light shielding plate and has a smaller cross section than other portions of the coupler.

12. The electronic device of claim 11, wherein the coupler is configured to couple the light guiding lenses at a position closer to the light output surfaces than to the light input surfaces.

13. The electronic device of claim 12, wherein the light guiding lenses and the coupler of the lens unit are made of a transparent resin and formed integral as one body.

14. The electronic device of claim 11, wherein the light guiding lenses comprise reflection surfaces between the light input surfaces and the light output surfaces, and the coupler is configured to couple the adjacent ones of the light guiding lenses between the reflection surfaces and the light output surfaces.

15. The electronic device of claim 14, wherein the light guiding lenses and the coupler of the lens unit are made of a transparent resin and formed integral as one body.

16. The electronic device of claim 11, wherein the light guiding lenses and the coupler of the lens unit are made of a transparent resin and formed integral as one body.

* * * * *